(12) United States Patent
Xiang et al.

(10) Patent No.: US 9,434,482 B2
(45) Date of Patent: Sep. 6, 2016

(54) CAB OF PASSENGER BOARDING BRIDGE AND PASSENGER BOARDING BRIDGE HAVING THE SAME AND DOCKING METHOD THEREOF

(71) Applicants: Shenzhen CIMC-Tianda Airport Support Ltd., Guangdong (CN); China International Marine Containers (Group) Co., Ltd., Guangdong (CN)

(72) Inventors: Wei Xiang, Guangdong (CN); Lei Shi, Guangdong (CN); Da Kang, Guangdong (CN); Zhaohong Zhang, Guangdong (CN)

(73) Assignees: SHENZHEN CIMC-TIANDA AIRPORT SUPPORT LTD, Guangdong (CN); CHINA INT'L MARINE CONTAINERS (GROUP) CO., LTD., Guandong (CN)

( * ) Notice: Subject to any disclaimer, the term of this patent is extended or adjusted under 35 U.S.C. 154(b) by 0 days.

(21) Appl. No.: 14/428,824

(22) PCT Filed: Aug. 9, 2013

(86) PCT No.: PCT/CN2013/081213
§ 371 (c)(1),
(2) Date: Mar. 17, 2015

(87) PCT Pub. No.: WO2014/040462
PCT Pub. Date: Mar. 20, 2014

(65) Prior Publication Data
US 2015/0274324 A1    Oct. 1, 2015

(30) Foreign Application Priority Data

Sep. 17, 2012  (CN) .......................... 2012 1 0344229

(51) Int. Cl.
*B64F 1/00*    (2006.01)
*B64F 1/305*   (2006.01)

(52) U.S. Cl.
CPC ............. *B64F 1/3055* (2013.01); *B64F 1/305* (2013.01)

(58) Field of Classification Search
CPC .............................. B64F 1/3055; B64F 1/305
USPC ................................. 14/69.5–72.5; 114/362
See application file for complete search history.

(56) References Cited

U.S. PATENT DOCUMENTS 2,035,193 A * 3/1936 Alton ................................. 14/39
2,531,263 A * 11/1950 Fink et al. ...................... 182/97
3,121,243 A * 2/1964 Phillips .......................... 14/71.5

(Continued)

*Primary Examiner* — Raymond W Addie
(74) *Attorney, Agent, or Firm* — Mayback & Hoffman, P.A.; Gregory L. Mayback; Rebecca A. Tie

(57) ABSTRACT

A cab of a passenger boarding bridge comprises: an active floor body having a back end connected to the front end of a cabin and a front end provided with a notch that accommodates a downwards or upwards opened door of an aircraft; a flap disposed corresponding to the notch and movably connected to the active floor body, the flap being turnable relative to the active floor body between a first position in which the flap closes the notch and a second position in which the flap exposes the notch; and an actuating device for driving the flap to turn. The cab is mounted to a front end of a cabin such that it serves not only aircraft having doors to be opened leftwards or rightwards but also those having doors to be opened downwards. Also disclosed are a passenger boarding bridge having the cab and a docking method thereof.

13 Claims, 7 Drawing Sheets

(56) References Cited

U.S. PATENT DOCUMENTS

| | | | |
|---|---|---|---|
| 3,122,789 A * | 3/1964 | Coffee | 425/466 |
| 5,224,437 A * | 7/1993 | Stanescu | 114/362 |
| 6,691,361 B2 * | 2/2004 | Rolfe et al. | 14/71.5 |
| 6,898,816 B2 * | 5/2005 | Tholen et al. | 14/71.5 |
| 7,069,611 B2 * | 7/2006 | Larson | 14/71.3 |
| 7,188,383 B2 * | 3/2007 | Tholen et al. | 14/71.5 |
| 7,596,826 B2 * | 10/2009 | Anderberg | 14/71.5 |
| 8,074,315 B2 * | 12/2011 | Okahira et al. | 14/71.5 |
| 8,302,237 B2 * | 11/2012 | Shimizu et al. | 14/71.5 |
| 8,387,191 B2 * | 3/2013 | Honeycutt | 14/36 |
| 8,806,690 B1 * | 8/2014 | Keith et al. | 14/71.5 |

* cited by examiner

US 9,434,482 B2

CAB OF PASSENGER BOARDING BRIDGE AND PASSENGER BOARDING BRIDGE HAVING THE SAME AND DOCKING METHOD THEREOF

CROSS-REFERENCE TO RELATED APPLICATIONS

This is a continuing application, under 35 U.S.C. §120, of co-pending International Patent Application No. PCT/CN2013/081213, filed on Aug. 9, 2013, which designated the United States and was not published in English; this application also claims the priority, under 35 U.S.C. §119, of People's Republic of China (PRC) Patent Application No. 201210344229.8, filed on Sep. 17, 2012; the prior applications are herewith incorporated by reference in their entireties.

STATEMENT REGARDING FEDERALLY SPONSERED RESEARCH OR DEVELOPMENT

Not applicable.

FIELD OF THE INVENTION

The present invention relates to a passenger boarding bridge, and particularly to a cab of a passenger boarding bridge and a passenger boarding bridge having the cab, and a docking method thereof.

BACKGROUND OF THE INVENTION

Passenger boarding bridges, as bridges connecting the airport terminals with the aircrafts, provide safe and comfortable space for passengers who walk in and out of the airports, and have been widely used in the airports. Currently, most of the passenger boarding bridges can dock with the aircrafts having the doors to be opened leftwards or rightwards. However, the existing regional aircrafts have the doors designed to be opened downwards and having side rails, i.e., being of the aircrafts having the doors to be opened downwards. Therefore, in the countries and regions where the regional aircrafts are in the majority, the existing cab of the passenger boarding bridge, which is designed for the aircrafts having the doors to be opened leftwards or rightwards, will interferes with the aircraft door when serves the aircraft having the door to be opened downwards, and cannot serve this kind of aircrafts, and accordingly cannot meet the requirements for docking between the regional aircrafts and the passenger boarding bridges.

SUMMARY OF THE INVENTION

A technical problem to be solved by the present invention is to provide a cab of a passenger boarding bridge, and a passenger boarding bridge having the cab, and a docking method thereof, which can serve not only the aircrafts having doors to be opened leftwards or rightwards but also those having doors to be opened downwards.

To this end, the present invention provides a cab of a passenger boarding bridge, which is mounted to a front end of a cabin of the passenger boarding bridge. The cab comprises:

an active floor body having a back end connected to the front end of the cabin and a front end provided with a notch that is adapted to accommodate a downwards or upwards opened aircraft door;

a flap disposed corresponding to the notch and movably connected to the active floor body, the flap being turnable relative to the active floor body between a first position in which the flap close the notch and a second position in which the flap exposes the notch; and an actuating device for driving the flap to turn, the actuating device comprising a mounting bracket fixedly connected to a bottom of the active floor body; and an actuator having a first end connected to the mounting bracket and a second end connected to a bottom of the flap.

As for the above-mentioned cab of the passenger boarding bridge, it further comprises a semi-automatic latching mechanism. The semi-automatic latching mechanism includes: a locking pin mounting structure disposed at the bottom of the flap, a locking pin being mounted on the locking pin mounting structure, and a first spring being sleeved on the locking pin; a first locking hole mounting structure disposed in a first mounting position at the bottom of the active floor body corresponding to a position of the locking pin mounting structure when the flap is in the first position, the first locking hole mounting structure having a first locking hole thereon for receiving the locking pin, wherein the locking pin is pulled out manually and is retracted automatically by the spring, and wherein the flap, when it is in the first position, is locked with the active floor body by the locking pin being received within the first locking hole.

As for the above-mentioned cab of the passenger boarding bridge, the semi-automatic latching mechanism further comprises a second locking hole mounting structure disposed in a second mounting position at the bottom of the active floor body corresponding to a position of the locking pin mounting structure when the flap is in the second position, the second locking hole mounting structure having a second locking hole thereon for receiving the locking pin, wherein the flap, when it is in the second position, is locked with the active floor body by the locking pin being received within the second locking hole.

As for the above-mentioned cab of the passenger boarding bridge, the semi-automatic latching mechanism further comprises: sensors disposed on the first and second locking hole mounting structures corresponding to the first and second locking holes, respectively; and shims respectively disposed within the first and second locking holes.

As for the above-mentioned cab of the passenger boarding bridge, the semi-automatic latching mechanism further comprises baffles movably mounted on the active floor body corresponding to the first and second locking holes, respectively.

As for the above-mentioned cab of the passenger boarding bridge, the left and right sides of the bottom of the front end of the flap are symmetrically provided with the semi-automatic latching mechanisms.

As for the above-mentioned cab of the passenger boarding bridge, at least one of the left and right sides of the flap is further provided with a trapezoidal guide block, two trapezoidal slopes of which are arranged upwards and downwards, respectively.

As for the above-mentioned cab of the passenger boarding bridge, the bottom of the active floor body is further provided with a pressure sensing device corresponding to at least one of the left and right sides of the flap, the pressure sensing device comprising: a lever mechanism including a bent rod, a straight rod, a wedge and a second spring, wherein the bent rod is hinged at a first end to the bottom of the active floor body and hinged at a second end to the straight rod, and wherein the second spring is connected at a first end to the bottom of the active floor body and connected at a second end to the bent rod, and wherein the wedge is fixedly connected to the first end of the bent rod; a sliding mechanism including a sliding groove fixedly mounted on the bottom of the active floor body and a slider fixedly mounted on the straight rod; and a pressure sensor, fixedly mounted on the straight rod.

As for the above-mentioned cab of the passenger boarding bridge, the bent rod comprises a first section, a second section and a third section, wherein the third section is a bent section, both ends of which form respectively a first hinge joint where the bent rod is hinged to the bottom of the active floor body and a second hinge joint where the bent rod is hinged to the straight rod, wherein the first and third sections are connected at the first hinge joint, and wherein the wedge is fixedly connected to the first section, and wherein the second section is connected between the first and third sections.

As for the above-mentioned cab of the passenger boarding bridge, a connection point of the second end of the second spring is close to the second hinge joint.

As for the above-mentioned cab of the passenger boarding bridge, the front end of the active floor body and a front end of the flap are respectively provided thereon with detachable front edges.

As for the above-mentioned cab of the passenger boarding bridge, the cab further comprises a transportable movable transition plate that is adapted to close the notch when the flap is in the second position.

In order to better achieve the above mentioned objectives, the present invention further provides a passenger boarding bridge including a cabin. The passenger boarding bridge further comprises a cab of the passenger boarding bridge as above mentioned, which is connected to a front end of the cabin.

In order to better achieve the above mentioned objectives, the present invention further provides a docking method by using the above-mentioned passenger boarding bridge. The docking method comprises:

when an aircraft with a door to be opened leftwards or rightwards is served, turning the flap of the cab of the passenger boarding bridge upwardly to the first position so that the flap closes the notch on the active floor body of the cab of the passenger boarding bridge to form an unnotched passageway, and manipulating the passenger boarding bridge such that the cab of the passenger boarding bridge joins with the door of said aircraft with the door to be opened leftwards or rightwards to form a passageway for docking; and when an aircraft with a door to be opened downwards is served, firstly turning the flap of the cab of the passenger boarding bridge downwardly to a second position to expose the notch on the active floor body of the cab of the passenger boarding bridge, then aligning the exposed notch with the door of said aircraft with the door to be opened downwards, then manipulating the passenger boarding bridge allowing the notch fully accommodates the door, subsequently overlapping one end of a transportable movable transition plate over the cab of the passenger boarding bridge to close the notch and overlapping the other end of the transportable movable transition plate over a floor surface of the aircraft to form a passageway for docking.

Hereinafter, the present invention is described in detail with reference to the accompanying drawings and embodiments, which, however, are not to limit the present invention.

DETAILED DESCRIPTION OF THE EMBODIMENTS

Hereinafter, the structural principle and operational principle of the present invention are described in detail with reference to the accompanying drawings.

Figure 1:
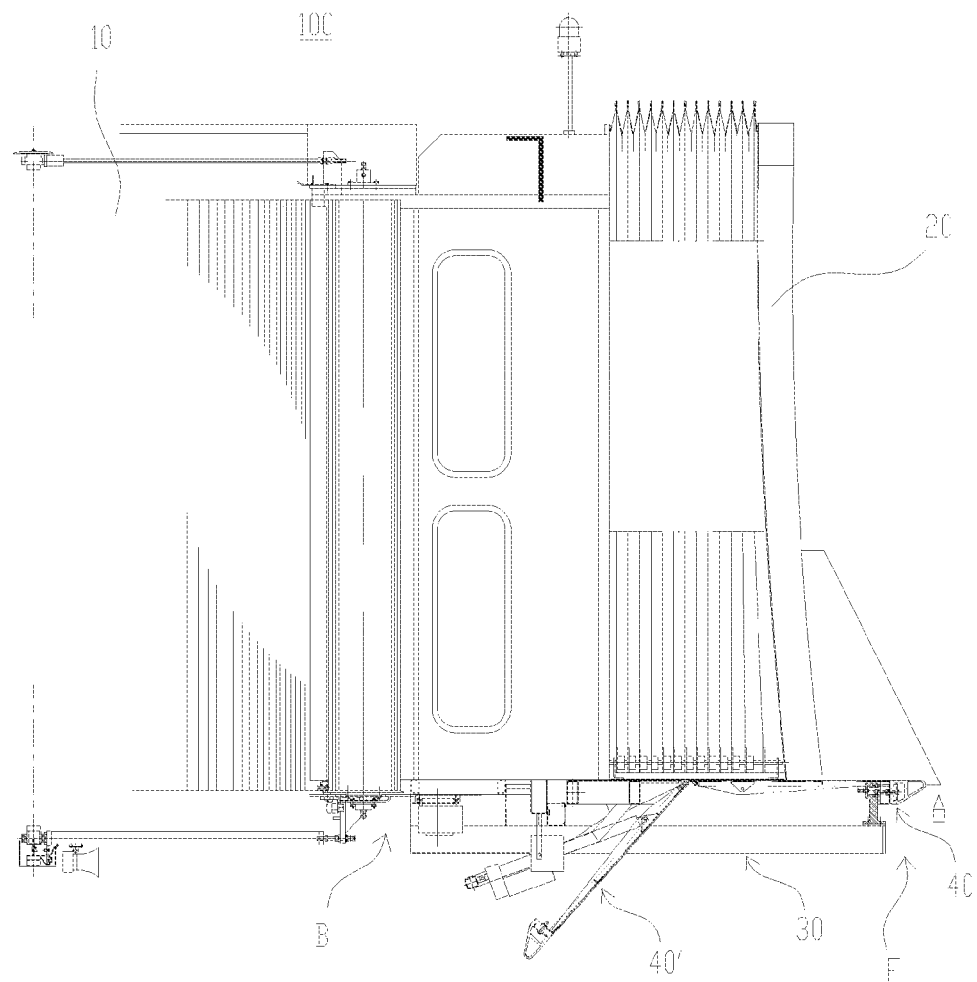
FIG. 1 is a side view of the cab of the passenger boarding bridge according to an embodiment of the invention, illustrating two different states when the flap is in a first position A and is turned towards a second position A', with the cab of the passenger boarding bridge not docking with the aircraft.

FIG. 1 shows a passenger boarding bridge 100 according to an embodiment of the invention, which comprises a cabin 10 and a passenger boarding bridge cab 20 that is mounted at a front end of the cabin 10 for docking with an aircraft door.

Figure 2:
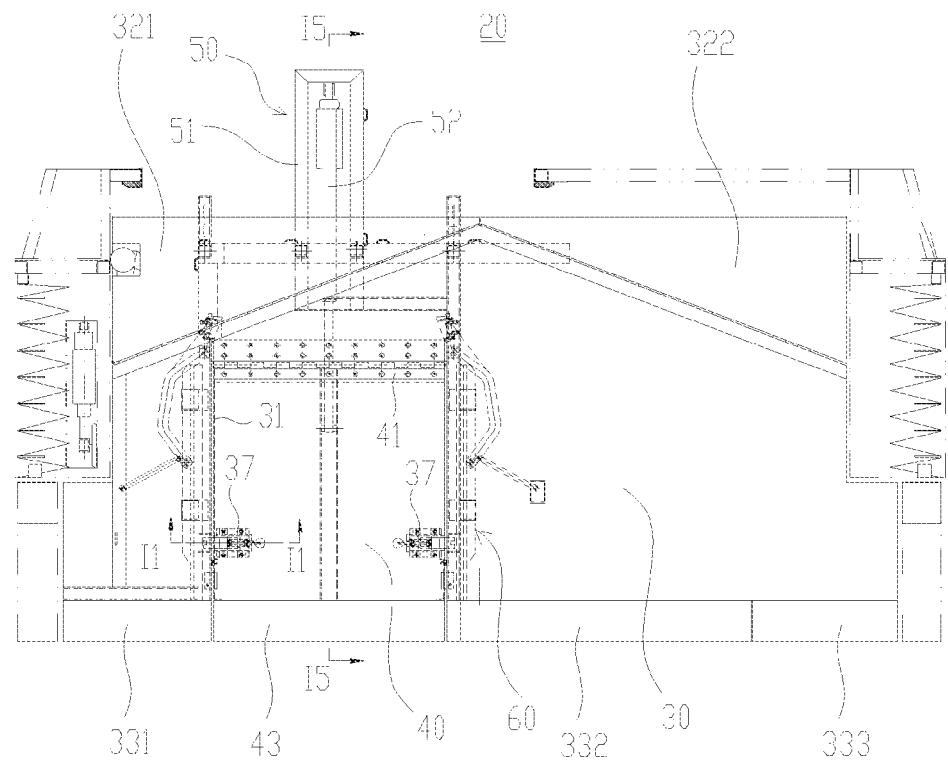
FIG. 2 is a top view of the cab of the passenger boarding bridge shown in FIG. 1 (with the flap in the first position A)
Figure 10:
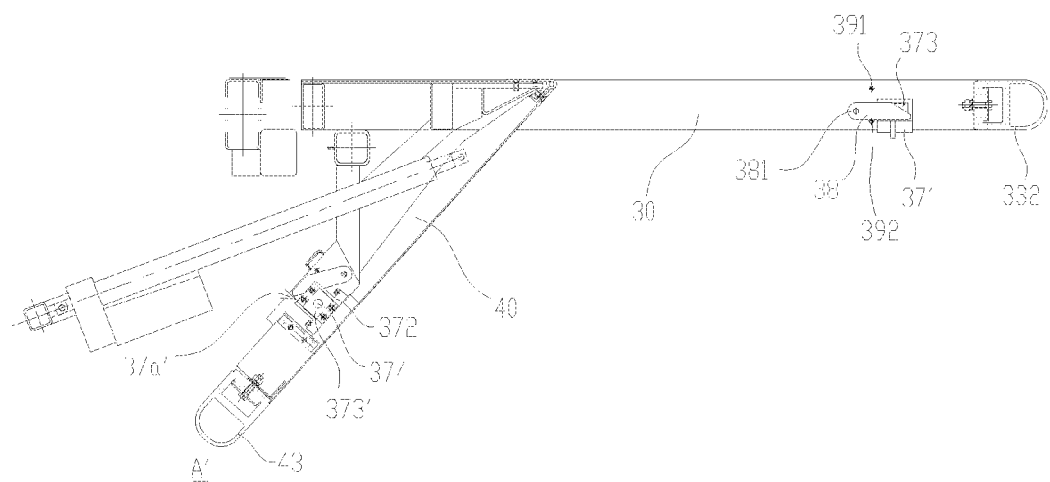
FIG. 10 is a side view corresponding to the flap in FIG. 9 in the second position A'.

Referring to FIG. 2, the cab 20 of the passenger boarding bridge according to the invention comprises an active floor body 30, a flap 40 and an actuating device 50, wherein transition plates 321, 322 are provided at the left and right sides of a back end B of the active floor body 30, respectively. Optionally, the transition plates 321, 322 are of triangular structure and adapted to connect with the cabin 10 (not shown in FIG. 2). The front end F of the active floor body 30 is provided with a notch 31 (which is covered by the flap 40 in FIG. 2), which is adapted to accommodate a downward or upward opened aircraft door. Preferably, the notch 31 is square shaped. The flap 40 is disposed corresponding to the notch 31 and movably connected to the active floor body 30. For example, the flap 40 is hinged to the active floor body 30 at an back end edge of the notch 31 via a flap hinge 41, so that the flap 40 can turn around the flap hinge 41 by a certain angle degree relative to the active floor body 30. For example, FIG. 1 shows a state in which the flap 40 is in a first position A and closes the notch 31 (by double dot dash lines), and a state in which the flap 40 is turning towards a second position A'. FIG. 10 shows a side view of the flap 40 when it is turned to the second position A'. At this time, the notch 31 is exposed to facilitate the aircraft door to be turned downwards, which aircraft has the door to be opened downwards. The first position A refers to a position where the flap 40 is flushed with the active floor body 30, i.e., a working position of the passenger boarding bridge cab 20 when it serves an aircraft having a door to be opened leftwards or rightwards. The second position A' refers to a position where the angle between the flap 40 and the active floor body 30 is greater than 90° (determined by the need), i.e., a working position of the passenger boarding bridge cab 20 when it serves an aircraft having a door to be opened downwards. The actuating device 50 is adapted for actuating the flap 40 to turn. Optionally, the actuating device 50 comprises a mounting bracket 51 and an actuator 52. The mounting bracket 51 is fixedly connected to a bottom of the active floor body 30. The actuator 52 is connected (optionally via a pin shaft) to the mounting bracket 51 at a first end and connected (optionally via another pin shaft) to the bottom of the flap 40 at a second end. Preferably, the actuator 52 is substantially arranged along the center line of the flap 40, with its opposite end connected to the central position of the bottom of the flap 40.

Preferably, the front end of the active floor body 30 (the front end other than the notch 31) is provided with detachable front edges 331, 332, 333, and the front end of the flap 40 is correspondingly provided with a detachable front edge 43, so as to improve the protection to an aircraft during the docking operation. The outsides of the mounted front edges 331, 332, 333 and 43 are substantively flushed with each other. According to an embodiment of the invention, the detachable front edges 331, 332, 333 and the detachable front edge 43 can be respectively connected to the active floor body 30 and the flap 40 by bolts and nuts (as shown in FIGS. 9 and 10, for example), so that the front edge can be detached easily when it is damaged and needs to be replaced or repaired.

Figure 3:
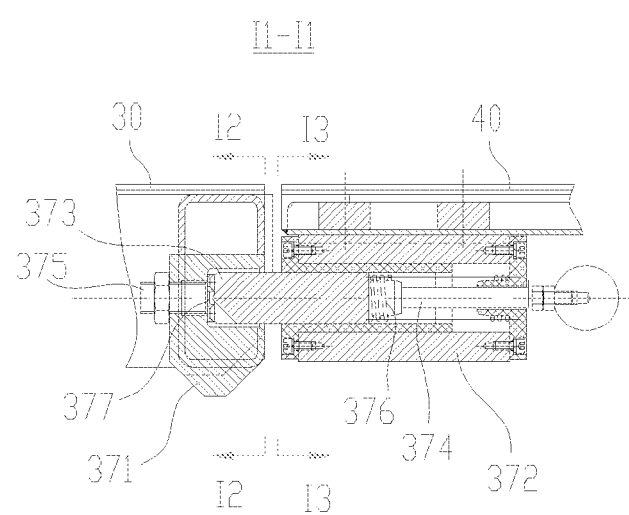
FIG. 3 is a cross-sectional view along I1-I1 in FIG. 2.
Figure 4:
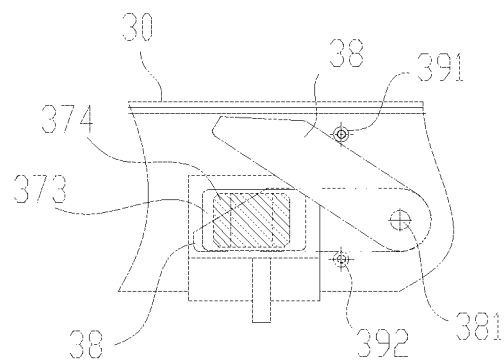
FIG. 4 is a cross-sectional view along I2-I2 in FIG. 3.
Figure 5:
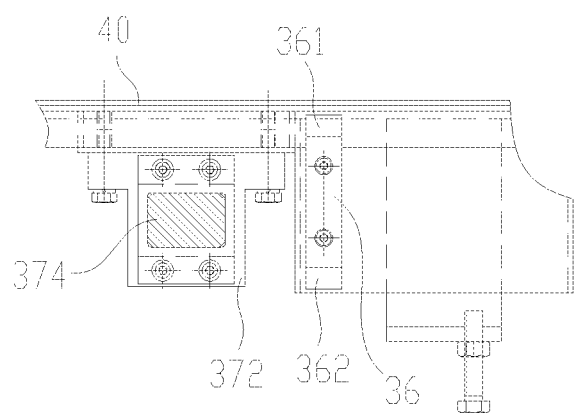
FIG. 5 is a cross-sectional view along I3-I3 in FIG. 3.

As shown in FIG. 2, the cab 20 of the passenger boarding bridge according to the invention may further comprise a semi-automatically latching mechanism 37. In this embodiment, the semi-automatically latching mechanisms 37 are symmetrically disposed on the left and right sides of the bottom of the front end of the flap 40. Referring to FIGS. 3-5, the semi-automatically latching mechanism 37 includes a first locking hole mounting structure 371 and a locking pin mounting structure 372, which are mounted correspondingly. The locking pin mounting structure 372 is disposed at the bottom of the flap 40 and provided with a locking pin 374, on which a first spring 376 is sleeved. The first locking hole mounting structure 371 is disposed in a first mounting position at the bottom of the active floor body 30 corresponding to the position of the locking pin mounting structure 372 when the flap 40 is in the first position A, for example, correspondingly disposed at the bottom of the front end of the active floor body 30. The first locking hole mounting structure 371 has a first locking hole 373 thereon for receiving the locking pin 374. In this embodiment, in order to prevent faulty operations and avoid dangers resulting from the manipulation of the flap 40 when passengers or staff are standing on the cab, the semi-automatic latching mechanisms 37 are used in the invention. That is, the locking pin 374 is pulled out by manual operation and is reset automatically by the first spring 376. In other embodiments, it is conceivable that the semi-automatic latching mechanism 37 may also use other locking mechanism to lock the flap. And it is also conceivable that the semi-automatic latching mechanism 37 may be disposed only on the left side or the right side of the bottom of the front end of the flap 40. Those, however, are not intended to limit the invention.

Figure 9:
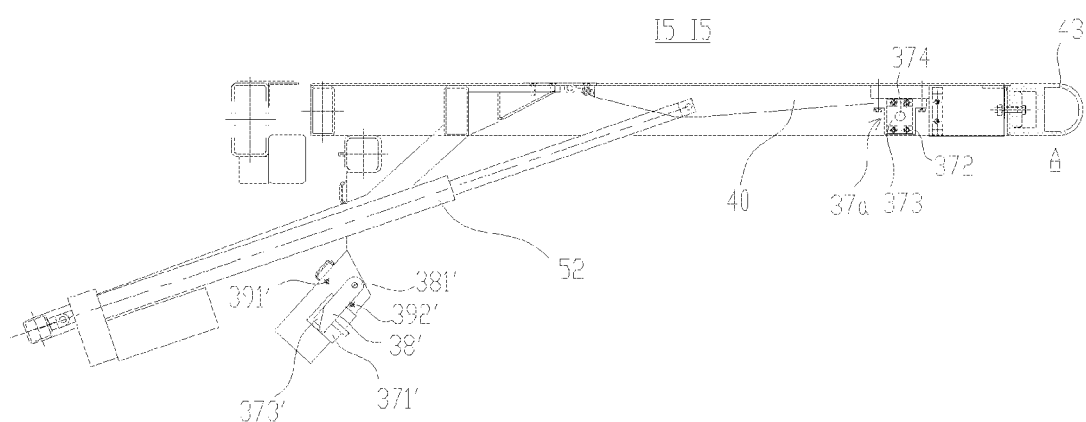
FIG. 9 is a cross-sectional view along I5-I5 in FIG. 2, illustrating a side view when the flap is in the first position A.

Referring to FIG. 9, the semi-automatic latching mechanism 37 further comprises: two second locking hole mounting structures 371', which are arranged symmetrically on the left and right sides and disposed in a second mounting position at the bottom of the active floor body 30 corresponding to the position of the locking pin mounting structure 372 when the flap 40 is in the second position A'. Each of said second locking hole mounting structures 371' has thereon a second locking hole 373' for receiving the locking pin 374. As shown in FIG. 9, the flap 40, when it is in the first position A, is locked and connected with the active floor body 30 by a locking structure 37a comprised of the first locking hole mounting structure 371 and the locking pin mounting structure 372. At this time, the locking pin 374 is received within the first locking hole 373 and the flap 40 is substantively flushed with the active floor body 30. As shown in FIG. 10, the flap 40, when it is in the second position A', is locked and connected with the active floor body 30 by a locking structure 37a' comprised of the second locking hole mounting structure 371' and the locking pin mounting structure 372. That this time, the locking pin 374 is received within the second locking hole 373' and the flap 40 is in the second position A'. The aircraft door will not interfere with the flap 40 when it opens downwards.

Continued referring to FIG. 3, preferably, a sensor 375 and a shim 377 are also provided to the first locking hole mounting structure 371. The sensor 375 is disposed correspondingly to the first locking hole 373 for detecting whether the locking pin 374 is reset to a predetermined position. The shim 377 is correspondingly disposed within the first locking hole 373 for preventing the locking pin 374 from touching and damaging the sensor 375 and for keeping the distance between the reset locking pin 374 and the sensor 375 to a predetermined value. Correspondingly, a sensor and a shim can also be provided to the second locking hole mounting structure 371', the structures, the effects, and the positions of which are similar to those of the sensor 375 and the shim 377 shown in FIG. 3. That is, the sensor on the second locking hole mounting structure 371' is disposed corresponding to the second locking hole 373', while the shim on the second locking hole mounting structure 371' is correspondingly disposed within the second locking hole 373'.

As shown in FIG. 4 and referring to FIGS. 9 and 10, preferably, the semi-automatic latching mechanism further comprises four baffles including two baffles 38 movably mounted on the active floor body corresponding to the two first locking holes 373, and two baffles 38' movably mounted on the active floor body corresponding to the two second locking holes 373'. Preferably, the baffles 38, 38' are connected to the active floor body via pin shafts 381, 381', and are respectively disposed in a position corresponding to the flap in the first position A and a position corresponding to the flap in the second position A', for covering the first locking holes 373 and the second locking holes 373' after the locking pins 374 have been manually pulled out. More preferably, upper limit members 391, 391' and lower limit members 392, 392' are respectively disposed on the upper sides and the lower sides of the active floor body 30 corresponding to the baffles 38, 38', for limiting the upward and downward turning of the baffles 38, 38'.

For example, when there is a need to dock with the aircraft having the door to be opened downwards, the locking pins 374 are pulled out manually from the first locking holes 373. Then, the baffles 38 turn downwards around the pin shafts 381 under the action of gravitational torque to a state of being limited by the lower limit members 392, e.g., the state of the baffles 38 as shown in FIG. 4 by double dot dash lines. At this time, the baffles 38 cover the first locking holes 373. After manual operation of a button, the flap 40 begins to turn from the first position A to the second position A'. When the flap 40 turns to the lowest position (i.e., turns to a position where the flap 40 has the lowest center of gravity), it continues to turn upwards to a position close to the second locking holes 373'. The locking pins 374 touch and press the baffles 38' upwards, causing the baffles 38' to turn upwards around the pin shafts 381' to a state of being limited by the upper members 391'. At this time, the locking pins 374 are received within the second locking hole 373' and locked.

After the completion of the task of docking with the aircraft having the door to be opened downwards, the locking pins 374 are pulled out manually from the second locking holes 373'. Then, the baffles 38' turn downwards around the pin shafts 381' under the action of gravitational torque to a state of being limited by the lower members 392'. After this time, the baffles 38' cover the second locking holes 373'. After manual operation of a button, the flap 40 begins to turn from the second position A' to the first position A. When the flap 40 turns downwards to the lowest position (i.e., turns to a position where the flap 40 has the lowest center of gravity), it continues to turn upwards to a position close to the first locking holes 373. The locking pins 374 touch and press the baffles 38 upwards, causing the baffles 38 to turn upwards around the pin shafts 381 to a state of being limited by the upper members 391, e.g., the state of the baffles 38 as shown in FIG. 4 by solid lines. At this time, the locking pins 374 are received within the first locking holes 373 and locked.

As shown in FIG. 5, preferably, trapezoidal guide blocks 36 are respectively provided on the left and right sides of the flap 40, which can be fixed through screws and are preferably of nylon material. Two trapezoidal slopes 361, 362 of each of the trapezoidal guide blocks 36 are respectively arranged upwards and downwards and take guiding function during the turning of the flap 40 to the first position A and during the turning of the flap 40 to the second position A', respectively. The trapezoidal guide blocks 36 are also capable of maintaining a certain distance between the flap 40 and the active floor body 30 to prevent interference or friction therebetween. In other embodiments, it is conceivable that only the left side or the right side of the flap 40 is provided with the trapezoidal guide block 36, which is not intended to limit the invention.

Figure 6:
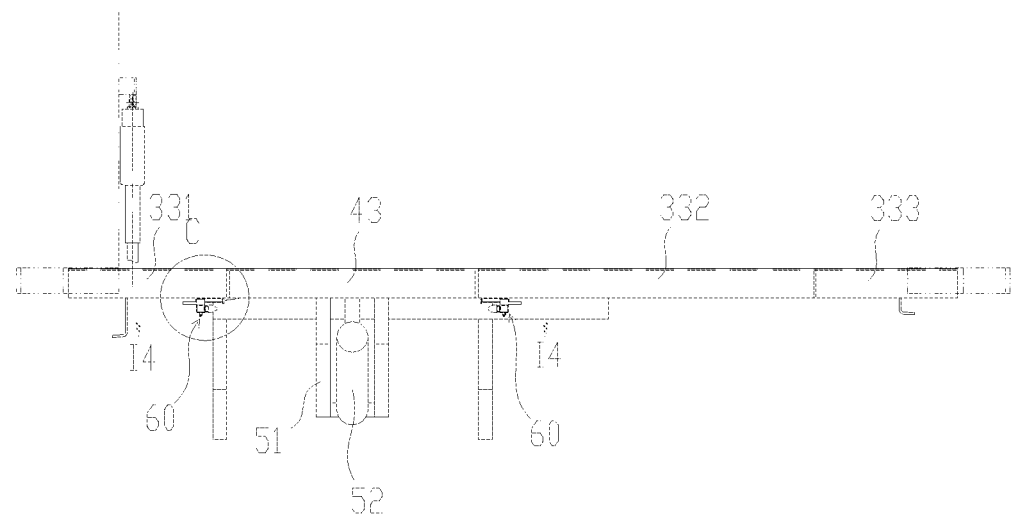
FIG. 6 is a front view of the cab of the passenger boarding bridge shown in FIG. 2.
Figure 7:
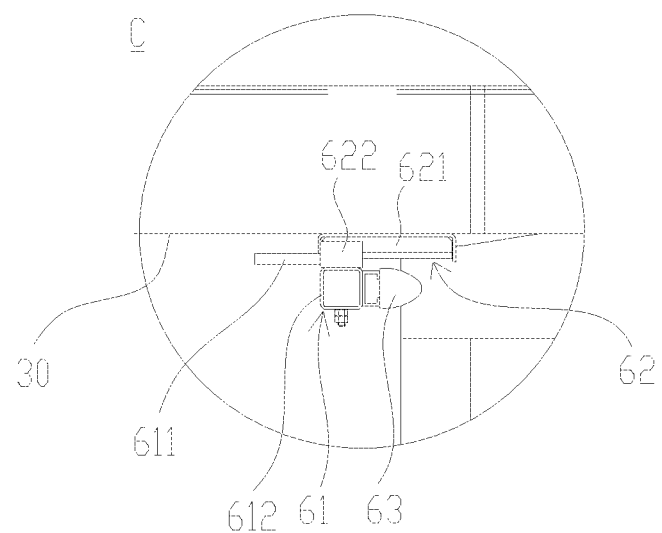
FIG. 7 is an enlarged view of the structure of the part C in FIG. 6.
Figure 8:
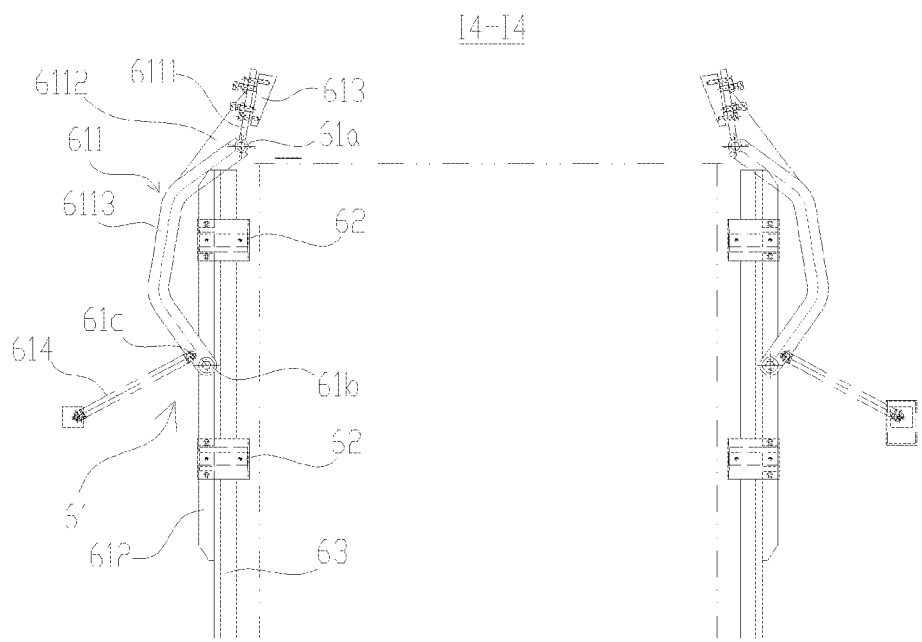
FIG. 8 is a cross-sectional view along I4-I4 in FIG. 6.

As shown in FIGS. 6-8, a pressure sensing device 60 is provided on each of the left and right sides of the bottom of the active floor body 30 close to the left and right sides of the flap 40. In the present invention, each of said pressure sensing devices 60 comprises a lever mechanism 61, a sliding mechanism 62 and a pressure sensor 63.

The lever mechanism 61 comprises a bent rod 611, a straight rod 612, a wedge 613 and a second spring 614. The bent rod 611 is hinged via a pin shaft to the bottom of the active floor body 30 at a first end and hinged via another pin shaft to the straight rod 612 at a second end. The second spring 614 is connected to the bottom of the active floor body 30 at a first end and to the bent rod 611 at a second end. Preferably, the bent rod 611 comprises a first section 6111, a second section 6112 and a third section 6113. The third section 6113 is a bent section, both ends of which respectively forms a first hinge joint 61a at which the bent rod 611 is hinged to the bottom of the active floor body 30 and a second hinge joint 61b at which the bent rod 611 is hinged to the straight rod 612. The first section 6111 and the third section 6113 are connected at the first hinge joint 61a. The wedge 613 is fixedly connected via a screw to the first end of the bent rod 611, in particularly to the first section 6111. The second section 6112 is connected between the first section 6111 and the third section 6113. The connection point 61c of the second end of the second spring 614 is close to the second hinge joint 61b.

The sliding mechanism 62 comprises a sliding groove 621 and a slider 622. The sliding groove 621 is fixedly mounted on the bottom of the active floor body 30. The slider 622 is fixedly mounted on the straight rod 612. The pressure sensor 63 is fixedly mounted on the straight rod 612.

The working process of the pressure sensing device 60 is described as follows. When the flap 40 turns to a position close to the second position A', the flap 40 presses the wedges 613 and pushes the bent rod 611 to rotate around the first hinge joints 61a, so as to push the left and right pressure sensors 63 which are fixedly connected to the straight rod 612 to slide out in the direction perpendicular to themselves with the cooperation of the sliding mechanisms 62 (the second spring 614 being stretched in this process). The pressure sensors 63 take the function of preventing both sides of the notch 31 from interfering or colliding with the door/air-stair ladder/handrails of the aircraft during the docking process.

As shown in FIG. 9, the state of the flap 40 in the first position A is illustrated. In this case, the flap 40 is flushed with the active floor body 30. The two baffles 38' in the positions corresponding to the two second locking holes 373' in this case cover said two second locking holes 373'.

As shown in FIG. 10, the state of the flap 40 in the second position A' is illustrated. In this case, the flap 40 is set at a predetermined angle to the active floor body 30. The two baffles 38 in the positions corresponding to the two first locking holes 373 in this case cover said two first locking holes 373.

Figure 11:
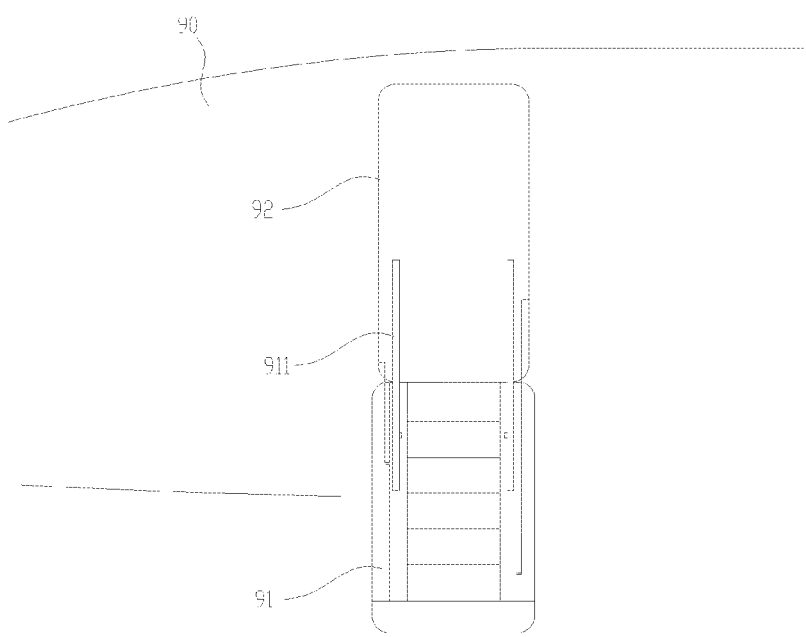
FIG. 11 is a schematic view of the aircraft with the door open.

FIG. 11 is a schematic view of the aircraft having a door to be opened downwards, with the door being opened. In this case, the door 91 with handrails 911 of the aircraft 90 is turned downwards to expose the entrance 92.

Figure 12:
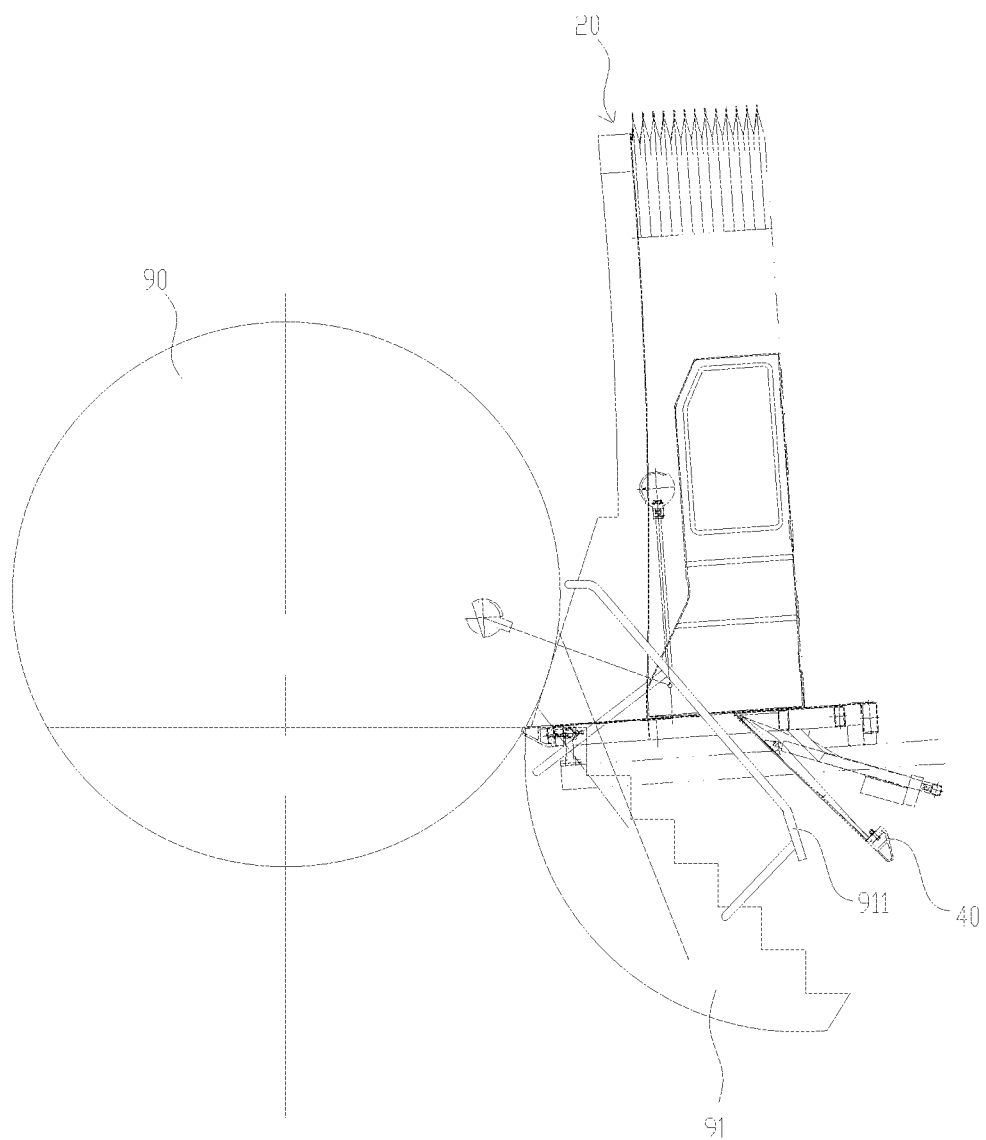
FIG. 12 is a side view of the cab of the passenger boarding bridge according to an embodiment of the invention, with the cab of the passenger boarding bridge docking with the aircraft.

FIG. 12 is a side view of a cab of the passenger boarding bridge according to an embodiment of the present invention in a state of docking with the aircraft. In this case, the flap 40 is in the second position A', and the cab 20 of the passenger boarding bridge accommodates the door 91 in the notch 31 on the active floor body 30. Moreover, the cab 20 of the passenger boarding bridge according to the present invention can be additionally provided with a transportable movable transition plate (not shown in the figures), which is adapted to close the notch 31 when the flap 40 is in the second position A', so as to form a passageway for the passengers getting on or off the aircraft.

Hereinafter, a docking method using the passenger boarding bridge 100 comprising the cab 20 of the passenger boarding bridge according to the invention will be described in detail with reference to an embodiment of the present invention:

1) When an aircraft with a door to be opened leftwards or rightwards is served, the flap 40 of the cab 20 of the passenger boarding bridge is turned to the first position A so that the flap 40 closes the notch 31 on the active floor body 30 of the cab. The semi-automatically latching mechanisms 37 are used to securely lock the flap 40 with the active floor body 30 so as to form an unnotched passageway. Then the passenger boarding bridge is manipulated such that the cab 20 of the passenger boarding bridge joins with the door of said aircraft with the door to be opened leftwards or rightwards, to form a passageway for docking. In this case, the cab 20 of the passenger boarding bridge can serve the aircraft with the door to be opened leftwards or rightwards like a conventional cab.

2) When there is a need to serve an aircraft with a door to be opened downwards, an operator can firstly go down under a cabin 10 and pull out the locking pins of the semi-automatic latching mechanisms 37. (The reason why the locking pins must be manually pulled out is to prevent a faulty operation of the operator. In particularly, if the operator makes a faulty operation to turn down the flap when staff or passengers are standing on the cabin, the staff or passengers will be in danger. Thus, the operator needs to manually pull out the locking pins in this case.) After the locking pin is pulled out, the operator can go onto the passenger boarding bridge and presses buttons to make the flap 40 turn downwards. When the flap 40 is turned to a position close to the second position A', the flap 40 presses the wedges 613 of the lever mechanisms 61, forcing the pressure sensors 63 mounted on the lever mechanisms 61 to slide out via the sliding mechanisms 62 to respectively both sides of the notch 31 opened up by the flap. (After the pressure sensors are turned out, whether the door//handrails of the aircraft is going to touch the structures around the notch during the docking can be detected.) When the flap 40 continues to turn to the second position A', the locking pins of the semi-automatically latching mechanisms 37 automatically pop into the respective locking holes and are locked therein. The operator aligns the notch 31 opened up by the flap 40 with the door 91, and manipulates the passenger boarding bridge to go forward until the cab 20 of the passenger boarding bridge comes into contact with the fuselage, in which case the notch 31 fully accommodates the door 91. Then, the operator can overlap a transportable movable transition plate with its one end over the cab 20 of the passenger boarding bridge and closing the notch 31 and the other end over a floor surface of the aircraft, forming a passageway for the passengers getting on or off the aircraft.

After the completion of docking operation, the operator can retract the transportable movable transition plate, and retract the bridge until the door 91 completely exits the notch 31. Then, the operator goes down under the cabin and pulls out the locked locking pins 374 of the semi-automatic latching mechanisms 37, and then presses buttons to make the flap 40 turn from the second position A' towards the first position A. During this process, the flap 40 gradually does not press the lever mechanisms 61, and the pressure sensors 63 are withdrawn under the action of the second springs 614. When the flap 40 continues to turn upwards in place, the locking pins of the semi-automatic latching mechanisms 37 automatically pop into the corresponding locking holes and are locked therein. In this case, the flap 40 is in the first position A. The docking procedure is completed.

Of course, the present invention may have a variety of other embodiments. Those skilled in the art can make all kinds of corresponding changes and modifications according to the present invention without departing from the spirit and essence of the present invention. It is intended that all these changes and modifications be covered by the appended claims of the present invention.

INDUSTRIAL APPLICABILITY

The cab of the passenger boarding bridge and the passenger boarding bridge having the same according to the present invention can be utilized to serve not only aircrafts having doors to be opened leftwards or rightwards but also aircrafts having doors to be opened downwards, thereby fully satisfying the requirements of docking between the regional aircrafts and the passenger boarding bridges.

What is claimed is:

1. A cab of a passenger boarding bridge mounted to a front end of a cabin of the passenger boarding bridge and comprising:
   an active floor body having a back end connected to the front end of the cabin and a front end provided with a notch that is adapted to accommodate a downwards or upwards opened aircraft door;
   a flap disposed corresponding to the notch and movably connected to the active floor body, the flap being turnable relative to the active floor body between a first position in which the flap closes the notch and a second position in which the flap exposes the notch to allow an aircraft door to be accommodated in the exposed notch; and
   an actuating device for driving the flap to turn, the actuating device comprising:
      a mounting bracket fixedly connected to a bottom of the active floor body; and
      an actuator having a first end connected to the mounting bracket and a second end connected to a bottom of the flap,
   wherein the cab further comprises a semi-automatic latching mechanism including:
      a locking pin mounting structure disposed at the bottom of the flap, a locking pin being mounted on the locking pin mounting structure, and a first spring being sleeved on the locking pin; and
      a first locking hole mounting structure disposed in a first mounting position at the bottom of the active floor body corresponding to a position of the locking pin mounting structure when the flap is in the first position, the first locking hole mounting structure having a first locking hole thereon for receiving the locking pin,
      wherein the locking pin is pulled out manually and is retracted automatically by the spring, and wherein the flap, when it is in the first position, is locked with the active floor body by the locking pin being received within the first locking hole.

2. The cab of the passenger boarding bridge according to claim 1, wherein the semi-automatic latching mechanism further comprises:
   a second locking hole mounting structure disposed in a second mounting position at the bottom of the active floor body corresponding to a position of the locking pin mounting structure when the flap is in the second position, the second locking hole mounting structure having a second locking hole thereon for receiving the locking pin,
   wherein the flap, when it is in the second position, is locked with the active floor body by the locking pin being received within the second locking hole.

3. The cab of the passenger boarding bridge according to claim 2, wherein the semi-automatic latching mechanism further comprises:
   sensors disposed on the first and second locking hole mounting structures corresponding to the first and second locking holes, respectively; and
   shims respectively disposed within the first and second locking holes.

4. The cab of the passenger boarding bridge according to claim 3, wherein the semi-automatic latching mechanism further comprises:
   baffles movably mounted on the active floor body corresponding to the first and second locking holes, respectively.

5. The cab of the passenger boarding bridge according to claim 2, wherein left and right sides of a bottom of a front end of the flap are symmetrically provided with the semi-automatic latching mechanisms.

6. The cab of the passenger boarding bridge according to claim 2, wherein at least one of left and right sides of the flap is further provided with a trapezoidal guide block, two trapezoidal slopes of which are arranged upwards and downwards, respectively.

7. The cab of the passenger boarding bridge according to claim 2, wherein the bottom of the active floor body is further provided with a pressure sensing device corresponding to at least one of left and right sides of the flap, the pressure sensing device comprising:
  a lever mechanism including a bent rod, a straight rod, a wedge and a second spring,
  wherein the bent rod is hinged at a first end to the bottom of the active floor body and hinged at a second end to the straight rod, and wherein the second spring is connected at a first end to the bottom of the active floor body and connected at a second end to the bent rod, and wherein the wedge is fixedly connected to the first end of the bent rod;
  a sliding mechanism including a sliding groove fixedly mounted on the bottom of the active floor body and a slider fixedly mounted on the straight rod; and
  a pressure sensor, fixedly mounted on the straight rod.

8. The cab of the passenger boarding bridge according to claim 7, wherein the bent rod comprises a first section, a second section and a third section, wherein the third section is a bent section, both ends of which form respectively a first hinge joint where the bent rod is hinged to the bottom of the active floor body and a second hinge joint where the bent rod is hinged to the straight rod, wherein the first and third sections are connected at the first hinge joint, and wherein the wedge is fixedly connected to the first section, and wherein the second section is connected between the first and third sections.

9. The cab of the passenger boarding bridge according to claim 8, wherein a connection point of the second end of the second spring is close to the second hinge joint.

10. The cab of the passenger boarding bridge according to claim 1, wherein the front end of the active floor body and a front end of the flap are respectively provided thereon with detachable front edges.

11. The cab of the passenger boarding bridge according to claim 1, wherein the cab further comprises a transportable movable transition plate that is adapted to close the notch when the flap is in the second position.

12. A passenger boarding bridge, comprising:
  a cabin; and
  the cab of the passenger boarding bridge according to claim 1, which is connected to a front end of the cabin.

13. A docking method for using a passenger boarding bridge according to claim 12, comprising:
  when an aircraft with a door to be opened leftwards or rightwards is served, turning the flap of the cab of the passenger boarding bridge upwardly to the first position so that the flap closes the notch on the active floor body of the cab of the passenger boarding bridge to form an unnotched passageway, and manipulating the passenger boarding bridge such that the cab of the passenger boarding bridge joins with the door of said aircraft with the door to be opened leftwards or rightwards to form a passageway for docking; and
  when an aircraft with a door to be opened downwards is served, firstly turning the flap of the cab of the passenger boarding bridge downwardly to a second position to expose the notch on the active floor body of the cab of the passenger boarding bridge, then aligning the exposed notch with the door of said aircraft with the door to be opened downwards, then manipulating the passenger boarding bridge such that the notch fully accommodates the door, subsequently overlapping one end of a transportable movable transition plate over the cab of the passenger boarding bridge to close the notch and overlapping the other end of the transportable movable transition plate over a floor surface of the aircraft to form a passageway for docking.

* * * * *

UNITED STATES PATENT AND TRADEMARK OFFICE
CERTIFICATE OF CORRECTION

PATENT NO. : 9,434,482 B2
APPLICATION NO. : 14/428824
DATED : September 6, 2016
INVENTOR(S) : Wei Xiang et al.

Page 1 of 1

It is certified that error appears in the above-identified patent and that said Letters Patent is hereby corrected as shown below:

On the Title Page

Item (73), Line 5 of the "Assignee" section, replace "Guandong" with "Guangdong".

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*